United States Patent [19]

Spinar et al.

[11] Patent Number: 5,126,754
[45] Date of Patent: Jun. 30, 1992

[54] INK JET PRINTING DENSITY CONTROLLER WITH PROGRAMMABLE ANGLE OF TRAVEL LOOK-UP TABLES FOR A PLOTTER

[75] Inventors: Brian L. Spinar, Santa Ana; Sandor I. Lengyel, Orange, both of Calif.

[73] Assignee: Calcomp Inc., Anaheim, Calif.

[21] Appl. No.: 673,770

[22] Filed: Mar. 20, 1991

[51] Int. Cl.⁵ .................... G01D 9/40; G01D 15/18
[52] U.S. Cl. ................... 346/29; 346/140 R; 346/139 R; 395/103
[58] Field of Search ............ 346/139 R, 140 R, 75, 346/29; 395/103, 105; 33/1 M, 18.1

[56] References Cited

U.S. PATENT DOCUMENTS

| | | | |
|---|---|---|---|
| 3,968,498 | 7/1976 | Uchiyama | 346/29 |
| 4,050,075 | 9/1977 | Hertz et al. | 346/75 |
| 4,065,775 | 12/1977 | Hou et al. | 346/140 R |
| 4,215,353 | 7/1980 | Kaieda et al. | 346/140 R |

Primary Examiner—Benjamin R. Fuller
Assistant Examiner—Alrick Bobb
Attorney, Agent, or Firm—Donald A. Streck; Wm. F. Porter, Jr.

[57] ABSTRACT

This invention maintains a selected printed ink drop density in an image recording device such as an X-Y plotter having a cartridge of the type which emits discrete ink droplets onto a recording medium and wherein the cartridge is transported along two axes with respect to the medium. There is sensing apparatus for sensing the two-dimensional velocity vector of the cartridge and control apparatus for regulating the rate at which the cartridge emits the droplets in accordance with the two-dimensional velocity vector. Thus, a given printed dot density on the medium is maintained for different angles of travel of the cartridge.

20 Claims, 3 Drawing Sheets

INK JET PRINTING DENSITY CONTROLLER WITH PROGRAMMABLE ANGLE OF TRAVEL LOOK-UP TABLES FOR A PLOTTER

BACKGROUND OF THE INVENTION

The invention is a controller for an ink jet cartridge in a plotter or similar device in which the cartridge can travel at various angles of travel with respect to a fixed axis in a plane of a recording medium to record a graphic image thereon. The controller of the invention regulates the printed line density (ink dots per meter) recorded on the recording medium to a desired density by programmably adjusting the ink drop rate of the cartridge with changes in the angle of travel. The invention employs a processor with programmable look-up tables relating various angles of travel to respective ink drop rates for various rapidly selectable printed line densities.

Ink jet printers are well-known in the art, as exemplified by U.S. Pat. No. 4,176,363 to Kasahara and U.S. Pat. No. 4,168,533 to Schwartz. Devices for controlling the print head motion are well-known, as exemplified by U.S. Pat. No. 4,422,781 to Armfield et al. and devices for scaling the image size are disclosed in U.S. Pat. No. 4,517,578 Tazaki. Various techniques for controlling the ink drop rate from the ink cartridge are known. For example, U.S. Pat. No. 4,791,435 to Smith et and U.S. Pat. No. 4,544,931 to Watanabe et al. is close regulating the ink drop rate in accordance with temperature. U.S. Pat. No. 4,524,364 to Bain et al. discloses controlling the ink drop rate in accordance with the delay between emission of the ink drop and its impact upon the medium. U.S. Pat. No. 4,542,384 to Tazaki suggests the feature of switching the print dot density on the medium between a text mode and a graph mode. Coupling actuation of the ink jet cartridge to the velocity of the cartridge in one dimension is disclosed in U.S. Pat. No. 4,436,439 to Koto and U.S. Pat. No. 4,789,874 Majette et al.

None of the foregoing references addresses the problem of maintaining a uniform printed line density recorded by a plotter whose cartridge can move at various angles with respect to the X and Y axes of the planar media to draw shapes and circles, for example. The problem arises because the cartridge travels at a faster velocity with respect to the recording medium for a given cartridge speed along the X axis (for example) as its speed along the Y axis increases. The foregoing references teach sensing velocity in one dimension with a shaft encoder, which of course cannot sense such an increase. Without a compensating mechanism, the printed line density will vary with the trajectory of the cartridge. Lines recorded along a 45 degree angle will have the smallest density while lines lying along the X axis, for example, will have the largest density. The line density of a circle recorded on the medium will be different at different parts of the circle. Thus, the image quality will suffer.

U.S. Pat. No. 4,215,353 to Kaieda et al. discloses an analog feedback control loop for computing the two-dimensional velocity of the ink jet cartridge using both X axis and Y axis velocity sensing and setting the ink jet cartridge pressure to control the printed line width (as distinguished from the line density or ink jet drop rate) to an amount proportional to the two-dimensional velocity of the cartridge.

The analog feedback loop described in the patent to Kaieda et al. suffers from several significant disadvantages. First, it does not control the ink jet drop rate but instead affects the ink jet cartridge pressure, which affects the printed dot size or line width but does not directly determine the printed line density (e.g., number of dots per meter). Thus, the teachings of the Kaieda et al. have nothing to do with maintaining constant line printing density for various angles of travel of the cartridge.

A further disadvantage is that its performance is limited by the response characteristics and stability of the analog feedback loop controlling the ink jet cartridge pressure. The components in the feedback control loop of Kaieda et al., which include a differential amplifier for example, must enable the feedback control loop to respond to rapid changes in direction encountered when recording sharp curves, etc., while enabling the feedback loop to remain stable. Such components are relatively expensive, are dedicated to the feedback control loop and therefore represent an added expense and bulk in the printer. In some cases the recorded image quality may be limited by the characteristics of the feedback control loop.

Yet another disadvantage of the feedback loop of Kaieda et al. is that it does not lend itself to rapid changes in the selected line density, for example to achieve gray scale variations or special effects in the recorded image. Such a change in the selected line density would require changing at least one of the parameters of the feedback loop.

Still another disadvantage of the feedback loop of Kaieda et al. is that it relies upon the cartridge servo X and Y shaft encoders to deduce the two-dimensional velocity of the cartridge. The drawback is that the shaft encoder senses position, and velocity must be inferred by noting the elapsed time between subsequent position counts of the encoder (for example). Thus, there is a delay equal to the elapsed time and the time required for the computation. Moreover, any error by one of the shaft encoders will affect the operation of the feedback loop.

Accordingly, it is an object of the invention to regulate the ink jet drop rate in accordance with the angle of travel of the cartridge across the media so as to maintain the printed line density at a selected density for all angles of travel without requiring a feedback control loop.

It is another object of the invention to regulate the ink jet drop rate in accordance with the angle of travel of the cartridge so as to maintain the printed line density at a selected density for all angles of travel without requiring additional hardware beyond that required in any plotter.

It is a further object of the invention to regulate the ink jet drop rate with respect to a single axis of motion of the cartridge in accordance with the angle of travel with respect to that axis so as to maintain the printed line density at a selected density for all angles of travel.

It is still another object of the invention to regulate the ink jet drop rate in accordance with the angle of travel of the cartridge so as to maintain the printed line density at a selected density for all angles of travel without using the X and Y axis shaft encoders to deduce the angle of travel.

It is a still further object of the invention to regulate the ink jet drop rate in accordance with the angle of travel of the cartridge so as to maintain the printed line density at a target density, while rapidly changing the target density in accordance with gray scale changes or special effects in a digitized image being plotted or in accordance with a selection by the user of a different printed line density.

A further object of the invention is to regulate the ink jet drop rate in accordance with the angle of travel of the cartridge so as to maintain the printed line density at a target density, while rapidly changing the target density in accordance with gray scale changes and while changing the dot size in accordance with half-tone or special effects in a digitized image being plotted or in accordance with selections made by the user.

These and other objects and benefits of the invention will become apparent in the detailed description which follows hereinafter when taken in conjunction with the drawings which accompany it.

SUMMARY OF THE INVENTION

In accordance with the invention, the ink droplet rate (number of ink droplets per unit displacement of cartridge travel) of an ink jet printer is regulated in accordance with the two-dimensional movement of the ink jet cartridge with respect to the recording medium so as to maintain a constant printed dot density. An ink jet plotter of the type including a microprocessor providing control and interfacing governs its ink drop rate in accordance with a drop rate control command from the microprocessor. A read-only memory accessed microprocessor contains a set of look-up tables which contain the correct value of the drop rate control command for each one of a set of target line printing densities and cartridge angles of travel. In accordance with a preferred embodiment, the microprocessor senses from the incoming X-Y position command data whenever the angle of travel of the cartridge changes, determines which one of the X and Y axis is the major axis of motion of the cartridge and computes the cartridge displacement vector angle with respect to the major axis of motion from the incoming X-Y position command data (received from a user's computer, for example). This angle specifies an address in the read-only memory containing the correct ink drop rate control command for a given target printing density. Preferably, the microprocessor forms a complete address word from the target density and the angle of travel and applies the address word to the address port of the read-only memory. The appropriate drop rate control command is thus fetched from the read-only memory and used to set the ink jet drop rate. This process is repeated periodically at a rate determined by the clock speed of the microprocessor.

Preferably, the drop rate control command is a scaling factor by which the number of output pulses of one of the X and Y axis cartridge shaft encoders corresponding to the major axis of motion is to be divided to provide the on-demand ink jet command pulse signal. The advantage is that the control circuitry requires no specially synthesized clock signal with which to reference the ink jet command pulse signal.

In accordance with a preferred embodiment, both the target density and the cartridge position command data are generated by the user's computer in accordance with a digitized image to be recorded by the plotter. The target density may be varied to show, for example, gray scale variations in the recorded image or special effects.

In accordance with another embodiment of the invention, the microprocessor also varies the pulse width of the ink jet control pulse in accordance with dot size commands received from the user's computer. The dot size may be varied in accordance with half-tone effects in the image to be recorded by the plotter.

DETAILED DESCRIPTION OF THE INVENTION

Figures 1, 2:
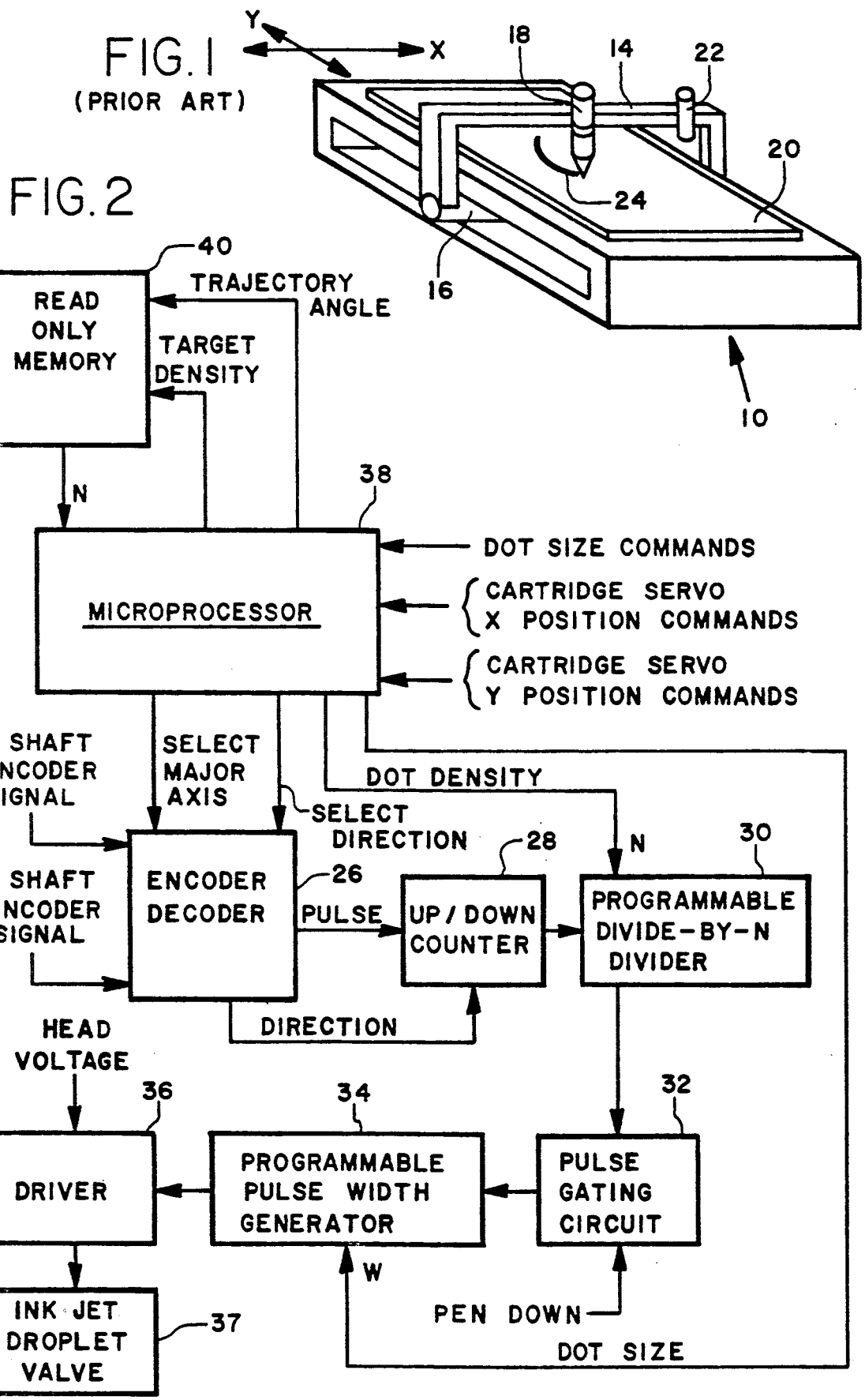
FIG. 1 is a simplified perspective view of a graphics plotter of the prior art.
FIG. 2 is a simplified block diagram of a system embodying the preferred embodiment of the invention.

Referring to FIG. 1, a plotter 10 of the prior art includes a chassis 12 supporting a carriage 14 which is transportable along a Y axis by a Y axis servo including a Y axis shaft encoder 16. A pen cartridge 18 mounted on the carriage 14 records an image on recording medium 20 and is transportable along an X axis by an X axis servo including an X axis shaft encoder 22. In the patent to Kaieda et al. discussed above, the cartridge 18 is an ink jet cartridge and a feedback control system determines the magnitude of the two-dimensional velocity vector of the cartridge 18 with respect to the media 20 from the outputs of the X and Y shaft encoders 22 and 16 and maintains the ink pressure inside the cartridge 18 at an amount proportional to the determined velocity magnitude. As explained above, this affects the size of the ink droplets but does not directly control their density (number of droplets or dots per meter). Thus, for example, if the X axis servo transports the cartridge 18 at a constant velocity while the cartridge 18 records an arc 24 on the medium 20, the printing density will be non-uniform along the length of the arc 24. Moreover, the direction (backward or forward) of the cartridge along a path is not taken into account, and therefore a move in the wrong direction due to servo instability (vibration) will cause drops to be ejected in locations on the medium 20 already inked.

The invention is illustrated in FIG. 2. It controls the ink drop rate (number of ink drops emitted by the cartridge per second). In the preferred embodiment, it uses the output of a selected one of the shaft encoders 16 or 22 as a reference clock signal, for the sake of simplicity and economy, but does not use the output of either shaft encoder 16, 22 to determine carriage velocity or angle of travel. If the velocity vector of the carriage is found to have its largest component lying along the Y axis, for example, then the Y axis is the major axis of motion, until a new position command is received. In this case, the Y axis shaft encoder 16 is selected, its quadrature encoder signal is decoded by a decoder 26 to produce a pulse and a direction signal for each count of the encoder 16. The direction signal reflects the direction (backward or forward) of the sensed motion with respect to a desired direction specified by a Select Direction signal sent by the microprocessor 38 to the encoder/decoder 26. The pulse and direction signal are fed to an up/down counter 28. The direction signal is set whenever the cartridge 18 moves along the Y axis in the direction specified by the Select Direction signal of the microprocessor 38. This feature prevents the cartridge 18 from printing on the medium 20 unless it is moving in the correct direction. If the cartridge 18 moves in the opposite direction, the counter 28 is incremented and no pulse is produced at the output of the counter 28 so that the ink droplet emission is stopped. When the cartridge 18 moves in the correct direction, the counter 28 is decremented until the cartridge 18 reaches the location where ink droplet emission was stopped. After the counter 28 reaches zero, its output reflects the pulse signal received from the decoder 26. This feature eliminates erroneous dot generation attributable to major axis positional errors.

The pulse signal output from the counter 28 is fed to a programmable divider 30. The programmable divider 30 produces an output pulse signal whose pulse repetition rate equals that of the input pulse signal divided by a scale factor N. As will be described below, the scale factor N is intelligently selected to compensate for changes in direction of travel of the cartridge 18 in the X-Y plane of the medium so as to maintain a selected target print density.

A pulse gating circuit 32 gates the output pulse signal from the programmable divider 30 in accordance with a PEN DOWN signal reflecting whether or not the ink jet cartridge 18 is presently in an up or down position on the carriage 14, so that the cartridge 18 only emits ink drops when it is in the down position. Also, the pulse gating circuit inserts a pulse into the pulse train received from the divider 30 each time the cartridge is moved to the down position so that the starting point of each line printed on the medium 20 is not missing a dot. The PEN DOWN signal also resets the programmable divider 30, so as to prevent a higher than desired droplet density at the start of the line.

The output of the pulse gating circuit 32 is fed to a programmable pulse width generator 34. The generator 34 produces an output pulse signal having the same instantaneous pulse repetition rate as the received pulse signal but having a pulse width determined by an input control word W. The skilled worker can readily construct such a circuit and its design need not be described herein. The output of the generator 34 is applied to the ink jet cartridge driver circuit 36 controlling a device such as an on-demand ink jet droplet valve or transducer 37. Various methods of implementing on-demand ink jet cartridges are known in the art. As one example, the ink jet droplet transducer 37 may be a piezo-electric transducer which constricts for the duration of the applied control pulse. The driver circuit 36 causes the ink jet droplet transducer 37 to emit an ink droplet with each pulse received from the generator 34, the amount of the ink in the droplet being a function of the time that the transducer 37 is allowed to constrict, which is determined by the pulse width, in accordance with well-known features of on-demand ink jet cartridges.

A microprocessor 38 controls the programmable divider 30 using a set of look-up tables stored in a read-only memory 40 connected to the microprocessor 38. While the microprocessor 38 also controls the programmable pulse width generator 34, the manner in which the microprocessor 38 controls the programmable divider 30 will be described first.

Each time the direction of travel of the cartridge 18 with respect to the medium 20 changes to a new direction, the microprocessor 38, determines which one of the X and Y axes is the major axis of the motion of the cartridge 18 (i.e., that axis whose displacement component is the greatest) and determines the new angle of travel of the cartridge 18 with respect to the major axis. The Y axis is the axis of the shaft encoder 16 and the X axis is the axis of the shaft encoder 22. Both determinations can change as often as once per microprocessor operating cycle. Preferably, the microprocessor 38 performs the foregoing determinations by evaluating the incoming X and Y cartridge position command data received (for example) from a user's computer controlling the plotter. The microprocessor 38 determines from the incoming command data the major axis of the carriage motion as well as the angle of travel with respect to the major axis, using conventional computational techniques.

The microprocessor transmits the angle of travel of the cartridge (an 8-bit word) as an address word to the address port of the read-only memory 40. For a given print density (number of dots per meter) the read-only memory 40 stores a look-up table relating each possible angle of travel to the correct factor by which the pulse rate of the output of the major axis shaft encoder (16 or 22) should be scaled to provide the correct ink drop rate at the input to the ink jet cartridge driver circuit 36. In response to the address word, the read-only memory sends the appropriate scale factor N to the microprocessor 38, which transmits N to the divisor input of the programmable divider 30.

Figure 3:
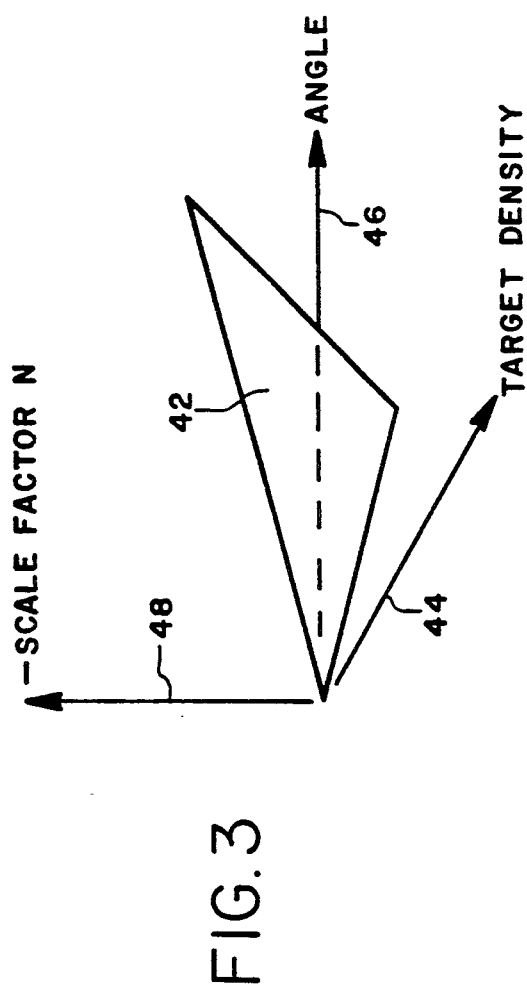
FIG. 3 is a three-dimensional graph illustrating an exemplary relationship between the ink drop rate, the target density and the cartridge trajectory angle.
Figure 4:
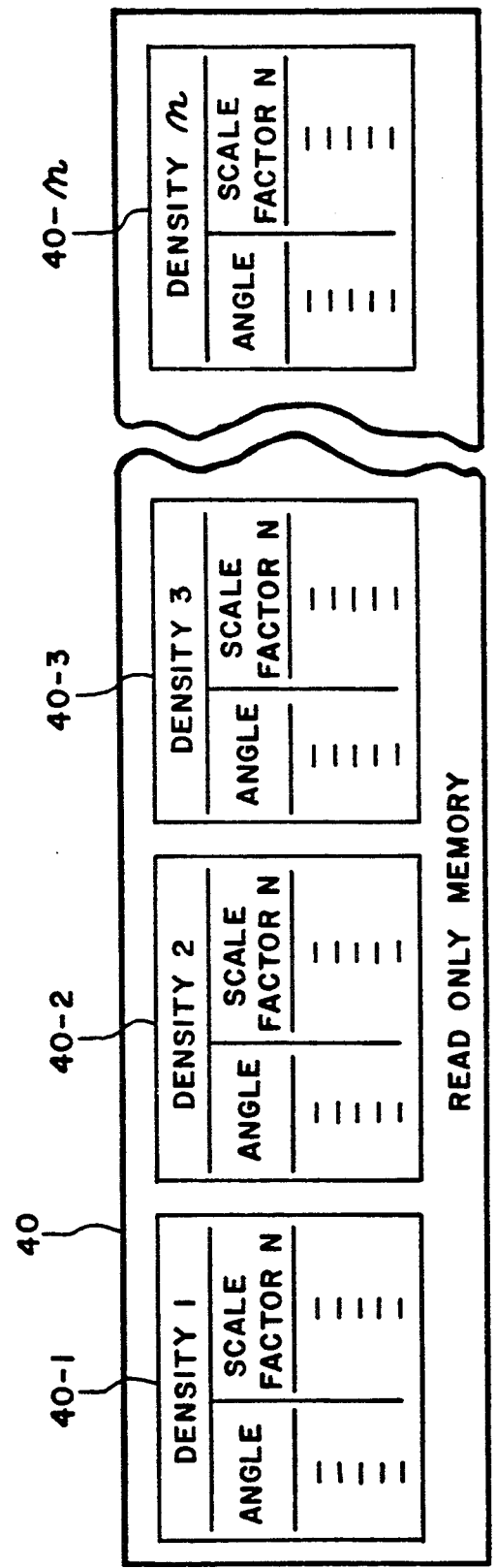
FIG. 4 is a simplified block diagram illustrating the architecture of a read-only memory in the system of FIG. 2 and corresponding to the graph of FIG. 3.

The information stored in the read-only memory 40 is graphically represented in FIG. 3 by a surface 42 in 3-dimensional space relating the scale factor N to the cartridge angle of travel and the print density. The 3-dimensional space is defined by the three axes 44, 46, 48 corresponding to the print density, the angle of travel and the scale factor. The shape of the surface 42 of FIG. 3 is consistent with the fact that as the angle of travel of the cartridge with respect to the major axis becomes steeper, the cartridge displacement is greater for a given displacement component along the major axis and therefore the ink drop rate must be greater. Accordingly, the scale factor must decrease. The shape of the surface 42 of FIG. 3 is also consistent with the fact that as the required or "target" print density increases for a given angle of travel, the ink drop rate must increase proportionately, and therefore the scale factor N must decrease. The skilled worker can readily employ the foregoing principles to approximate to an accurate degree the surface 42 for a given system design.

The information of FIG. 3 may be represented in the read-only memory 40 by a set of n look-up tables 40-1, 40-2, 40-3, . . . 40-n. Each look-up table relates all possible angles of travel of the carriage to the correct scale factor N for a certain print density. If, for example, the angle of travel is represented in the microprocessor 38 by an 8 bit word, then there are 256 possible angles of travel listed in each of the tables 40-1 through 40-n along with their appropriate scale factors. If the target print density is represented in the microprocessor 38 by a four bit word, then there are 16 possible printing densities and there are 16 look-up tables 40-1 through 40-16 in the read-only memory 40.

Figure 5:
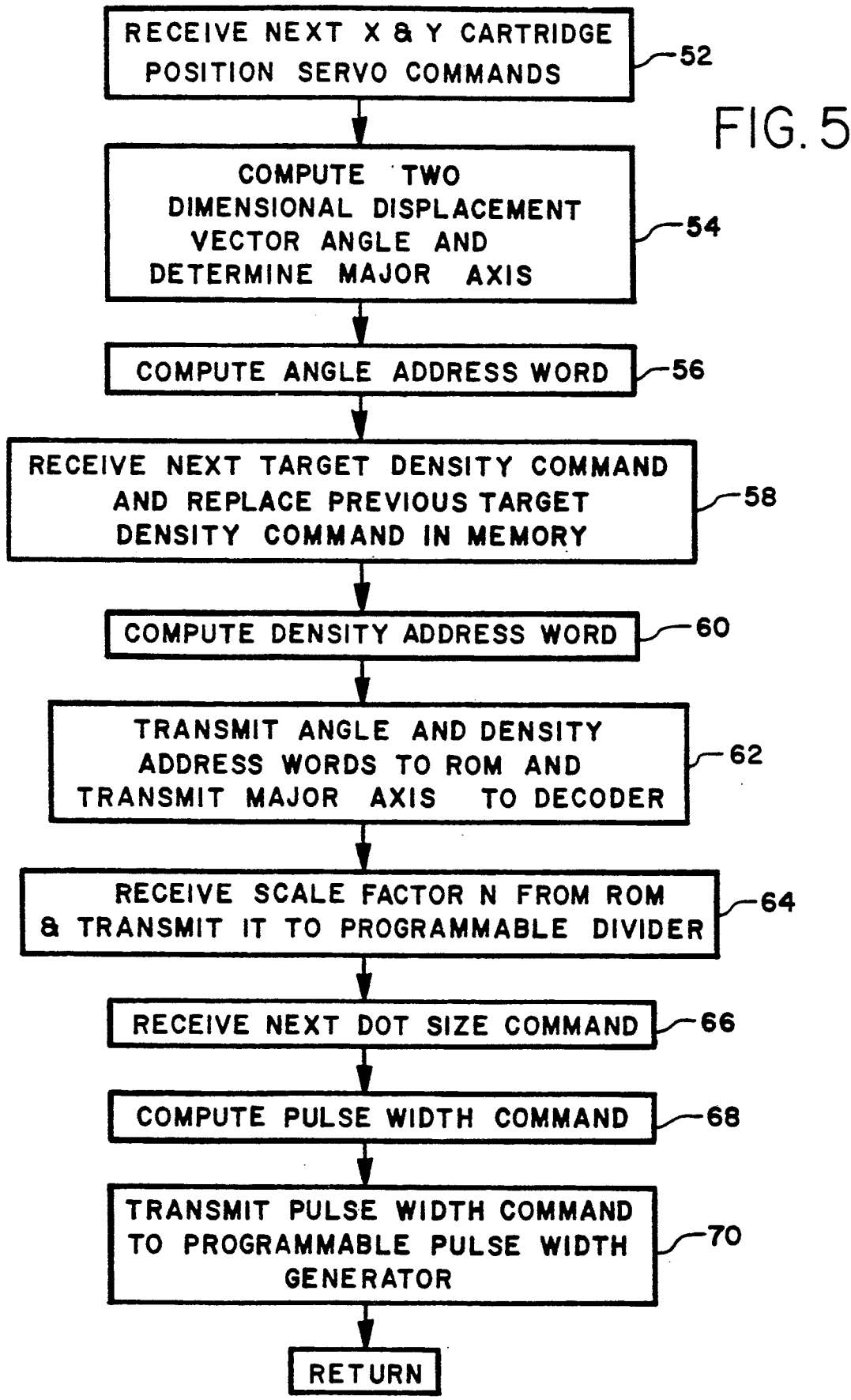
FIG. 5 is a flow diagram illustrating the operation of a control microprocessor in the system of FIG. 2.

FIG. 5 illustrates how the microprocessor 38 operates each time it senses a change in cartridge angle of travel in accordance with the preferred embodiment of the invention. The microprocessor 38 receives the next X and Y carriage commands from the user's computer (block 52). From these commands, the microprocessor 38 determines the major axis of cartridge travel and computes the angle of travel of the cartridge 18 with respect to the major axis (block 54). From the foregoing, the microprocessor 38 generates an angle address word (block 56). The microprocessor 38 may also receive an up-dated target printing density command from the user's computer (block 58) from which the microprocessor 38 generates a density address word (block 60). The microprocessor 38 forms a complete address word from the angle address word and the density address word and transmits the complete address word to the address port of the read-only memory 40 and transmits to the decoder 26 a one-bit signal selecting the output of one of the two shaft encoders 16, 22 corresponding to the major axis of motion (block 62). The read-only memory 40 provides the appropriate scale factor N which is applied to the divisor input of the programmable divider 30 (block 64).

Returning now to FIG. 2, the pulse width count W controlling the programmable pulse-width generator 34 is generated by the microprocessor 38. The microprocessor 38 may receive from the user's computer a dot size command, specifying a different dot size to be printed (block 66 of FIG. 5). The microprocessor 38 may scale the dot size command to fit within the parameters (such as dot size range) of the particular cartridge 18 and to fit the parameters of the pulse width generator circuit 34, in accordance with well-known principles in the art (block 68). In any case, the microprocessor 38 responds to the received dot size command by sending a corresponding pulse width count W to the pulse width generator 34 (block 70). This completes one cartridge control cycle of the microprocessor 38, and the entire process is repeated again with updated inputs.

A principal advantage of the invention is that it provides two-dimensional movement control of the ink drop rate to maintain a given printing density. In its preferred embodiments, it does this without requiring any analog feedback control loops. By relying instead upon a representation in a read-only memory of the 3-dimensional relationship between ink droplet rate, angle of travel and printing density, the system is more accurate, versatile and responsive.

A related advantage of the invention is that both the microprocessor 38 and the read-only memory 40 are required for other conventional tasks in such plotters and therefore represent no additional hardware costs.

Still another advantage of the invention is that the printer can change printing density once each microprocessor control cycle, which, together with the ability to vary dot size upon command once each control cycle, makes it sufficiently versatile to accommodate special effects at slow cartridge velocities, such as halftones and gray scale variations.

Wherefore, having thus described the invention, what is claimed is:

1. In an image recording device such as an X-Y plotter having a cartridge which emits discrete ink droplets onto a recording medium, said cartridge being transportable along two perpendicular axes of a two-dimensional X-Y coordinate system with respect to said medium, the improvement comprising:
    means for sensing a velocity vector of said cartridge in said two-dimensional X-Y coordinate system; and
    means for regulating a rate at which said cartridge emits said droplets in accordance with an acute angle of said velocity vector with one of said two perpendicular axes, whereby to maintain a given printed dot density on said medium for different angles of travel of said cartridge.

2. The improvement of claim 1 where said means for sensing a displacement vector of said cartridge comprise:
    means for determining a major axis of motion from among X and Y axes relative to said medium, and
    means for determining an acute angle of travel of said cartridge with respect to said major axis of motion.

3. The improvement of claim 2 wherein said means for regulating a droplet rate comprise:
    means for setting the droplet rate in accordance with a constant of proportionality; and
    means for selecting said constant of proportionality relating a given printed dot density to said angle of travel.

4. The improvement of claim 3 wherein said means for determining a major axis of motion comprises:
    means for receiving cartridge position command data; and
    means for inferring said major axis and said angle of travel from said cartridge position command data.

5. The improvement of claim 4 wherein said image recording device comprises X and Y shaft encoder means for sensing an amount of travel of said cartridge along said X and Y axes respectively, and wherein said means for setting said droplet rate comprise:
    on demand ink jet valve means for enabling emission of a single ink droplet from said cartridge in response to a pulse signal; and
    means for applying a droplet control pulse signal to said ink jet valve means with a pulse repetition rate related by said constant of proportionality to an output of one of said X and Y shaft encoder means corresponding to said major axis of motion of said cartridge.

6. The improvement of claim 3 wherein said means for selecting a constant of proportionality comprises:
    look-up table means relating a set of angles of travel of said cartridge for a given printing density to a corresponding set of constants of proportionality; and
    means for addressing said look-up table means with an angle of travel determined by said means for selecting.

7. The improvement of claim 6 wherein said look-up table means relates a set of angles of travel to a corresponding set of constants of proportionality for each one of a range of printing densities, said means for addressing further comprising:
    means for addressing said look-up table means with said angle of travel determined by said determining means and with desired printing density, whereby to fetch the appropriate constant of proportionality for any one of said set of angles of travel for any printing density within said range of printing densities.

8. The improvement of claim 7 wherein the size of each droplet emitted by said ink jet cartridge is a function of a pulse width of said droplet control pulse signal, said improvement further comprising:
    means for setting said pulse width in accordance with a received command.

9. The improvement of claim 2 further comprising:
    means for sensing whether motion of said cartridge along said major axis is in a desired direction; and means for preventing emission of an ink droplet from said cartridge whenever said motion is in a direction opposite said desired direction or retraces a path on said medium previously traveled by said cartridge.

10. In an image recording device such as an X-Y plotter employing an on-demand ink jet cartridge for recording an image onto an ink recording medium in response to received cartridge position command data, said recording device having X and Y shaft encoder means for detecting motion of said cartridge along X and Y axes of a two-dimensional X-Y coordinate system with respect to said recording medium and on-demand ink jet valve control means responsive to a control pulse signal for emitting a single ink droplet for each pulse in said signal, a system for controlling linear density of ink droplets on said medium comprising:

decoder means for producing a pulse signal from a selected one of aid X and Y shaft encoder means;

programmable scaling means for changing a pulse repetition rate of said pulse signal by a scale factor to produce said control pulse signal;

read-only memory means for storing a look-up table relating each angle of travel of said cartridge in a range of angles to a corresponding scaling factor with which said ink jet cartridge produces a given linear printing density on said medium; and microprocessor means for selecting one of said X and Y axes as a major axis of motion of said cartridge and an angle of travel of said cartridge with respect to said major axis of motion from said cartridge position command data, for selecting a corresponding one of said X and Y shaft encoder means as said decoder means, and for fetching a scale factor for said programmable scaling means appropriate to said angle of travel from said read-only memory.

11. The system of claim 10 wherein said decoder means produces a direction signal representing a direction of travel of said cartridge along said major axis, motion said system further comprising:

up/down counter means responsive to said direction signal for preventing said pulse signal from enabling said valve control means whenever said cartridge does not travel in a desired direction or retraces a path on said medium previously traveled by said cartridge.

12. The system of claim 10 wherein the size of each ink droplet is proportional to a pulse width of said control pulse signal, said system further comprising:

pulse width control means for setting the pulse width of said control pulse signal in accordance with a pulse width command from said microprocessor.

13. The system of claim 10 further comprising gating means for enabling said control pulse signal in accordance with a pen up/pen down signal.

14. In an image recording device such as an X-Y plotter having a cartridge which emits discrete ink droplets onto a recording medium, said cartridge being transportable along two axes of a two-dimensional X-Y coordinate system with respect to said medium, a system for regulating linear ink drop density recorded on said medium, comprising:

means for sensing a parameter of a velocity vector of said cartridge in said two-dimensional X-Y coordinate system;

look-up table means for providing for a given linear ink drop density factor on said medium a predetermined individual scale factor for each one of a set of plural values of said parameter; and means for scaling a rate at which said cartridge emits said droplets from a rate of a timing signal in accordance with an appropriate scaling factor provided by said look-up table means, whereby to maintain a given printed ink drop density on said medium for various velocity vectors of said cartridge.

15. The system of claim 14 wherein said parameter comprises an angle of travel of said cartridge with respect to one of said two axes along which a component of displacement of said cartridge is greatest.

16. The system of claim 15 wherein said image recording device further comprises a shaft encoder means for sensing motion along each of said two axes, and wherein said timing signal comprises a pulse signal derived from a shaft encoder means of one of said two axes.

17. The system of claim 16 wherein said means for sensing a parameter of a displacement vector of said cartridge comprises microprocessor means for deducing from received cartridge position command data which one of said two axes has the greatest component of the displacement of said cartridge and the angle of travel of said cartridge with respect to said one axis, said angle of travel being said parameter of said displacement vector.

18. The system of claim 14 wherein said look-up table means comprises means for providing for any one of a set of linear printing densities an appropriate scaling factor for each one of a set of angles of travel, whereby to permit selection of a variety of printing densities.

19. The system of claim 14 further comprising means for controlling a pulse width of said timing signal whereby to regulate a size of each ink droplet and width of lines recorded on said medium.

20. The system of claim 15 further comprising means for inhibiting said timing signal in accordance with a direction of travel of said cartridge along said one axis and in accordance with a pen up/pen down signal.

* * * * *